(12) United States Patent
Kantecki et al.

(10) Patent No.: US 10,754,783 B2
(45) Date of Patent: Aug. 25, 2020

(54) TECHNIQUES TO MANAGE CACHE RESOURCE ALLOCATIONS FOR A PROCESSOR CACHE

(71) Applicant: Intel Corporation, Santa Clara, CA (US)

(72) Inventors: Tomasz Kantecki, Ennis (IE); John Browne, Limerick (IE); Chris Macnamara, Limerick (IE); Timothy Verrall, Pleasant Hill, CA (US); Marcel Cornu, Clare (IE); Eoin Walsh, Shannon (IE); Andrew J. Herdrich, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/024,611

(22) Filed: Jun. 29, 2018

(65) Prior Publication Data
US 2019/0042454 A1    Feb. 7, 2019

(51) Int. Cl.
| | |
|---|---|
| *G06F 12/00* | (2006.01) |
| *G06F 12/08* | (2016.01) |
| *G06F 13/00* | (2006.01) |
| *G06F 12/0891* | (2016.01) |
| *G06F 9/50* | (2006.01) |
| *G06F 9/455* | (2018.01) |

(52) U.S. Cl.
CPC ...... *G06F 12/0891* (2013.01); *G06F 9/45558* (2013.01); *G06F 9/5016* (2013.01); *G06F 2009/45583* (2013.01); *G06F 2212/604* (2013.01)

(58) Field of Classification Search
CPC ....... G06F 12/0891; G06F 2009/45583; G06F 2212/604; G06F 9/45558; G06F 9/5016
USPC ......................................................... 711/135
See application file for complete search history.

(56) References Cited

U.S. PATENT DOCUMENTS

| | | | | |
|---|---|---|---|---|
| 5,278,964 A | * | 1/1994 | Mathews | G06F 12/0864 711/3 |
| 8,327,187 B1 | * | 12/2012 | Metcalf | G06F 9/5022 714/10 |
| 2011/0126265 A1 | * | 5/2011 | Fullerton | G06F 21/53 726/4 |
| 2014/0068140 A1 | * | 3/2014 | Mylly | G06F 12/0873 711/102 |
| 2014/0281248 A1 | * | 9/2014 | Alameldeen | G06F 12/0864 711/128 |
| 2016/0117241 A1 | * | 4/2016 | Shah | G06F 12/0871 711/119 |
| 2016/0378678 A1 | * | 12/2016 | Lemay | G06F 12/1009 711/163 |
| 2017/0090987 A1 | * | 3/2017 | Hearn | G06F 9/4881 |
| 2017/0091108 A1 | * | 3/2017 | Arellano | G06F 12/0888 |
| 2017/0094377 A1 | * | 3/2017 | Herdrich | H04L 43/10 |
| 2017/0262375 A1 | * | 9/2017 | Jenne | G06F 12/0891 |
| 2018/0095875 A1 | * | 4/2018 | Zhang | G06F 12/128 |
| 2018/0300182 A1 | * | 10/2018 | Hwang | G06F 9/45558 |

* cited by examiner

*Primary Examiner* — Mohamed M Gebril
(74) *Attorney, Agent, or Firm* — Compass IP Law PC

(57) ABSTRACT

Examples include techniques to manage cache resource allocations associated with one or more cache class of service (CLOS) assignments for a processor cache. Examples include flushing portions of an allocated cache resource responsive to reassignments of CLOS.

19 Claims, 11 Drawing Sheets

System 100

Scheme 200
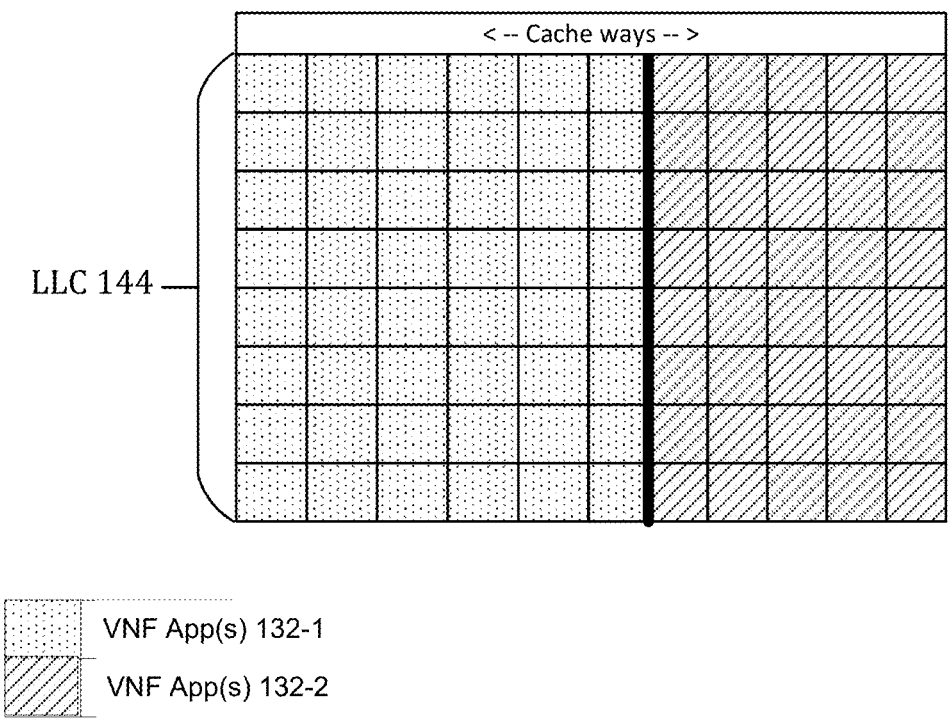
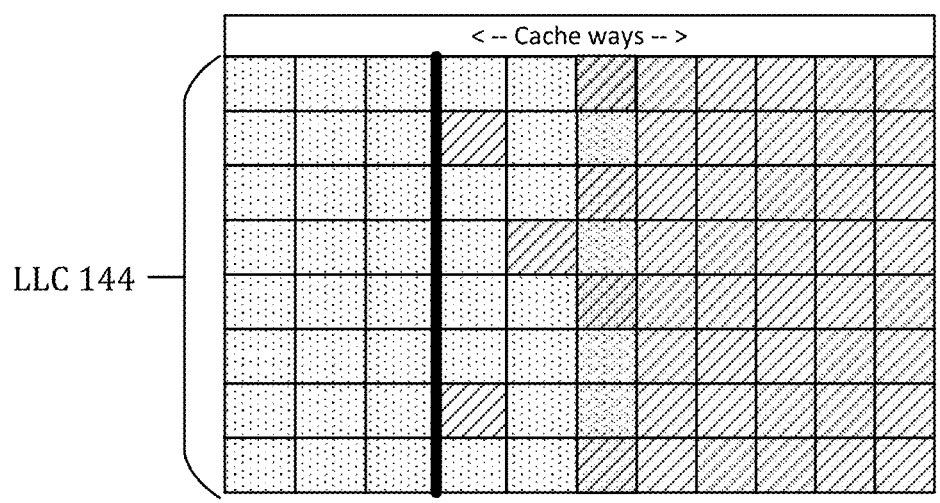
*FIG. 2*

Scheme 400
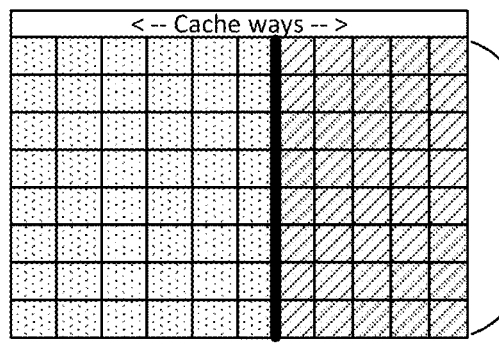
Allocation 410
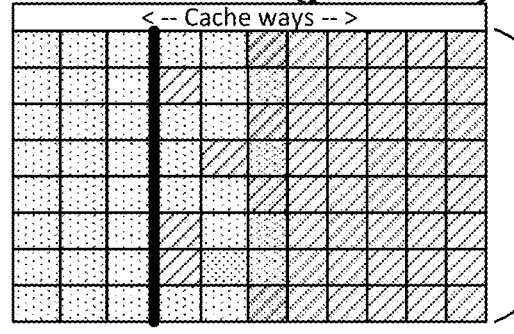
Allocation 420 (pre-flush)
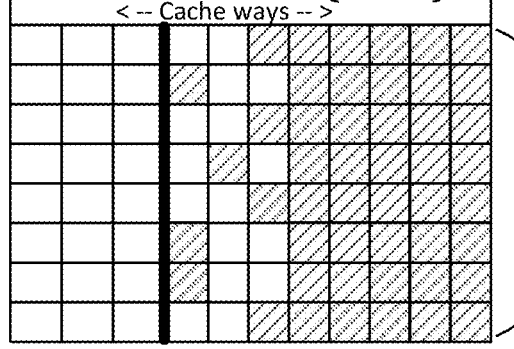
Allocation 420 (flush)
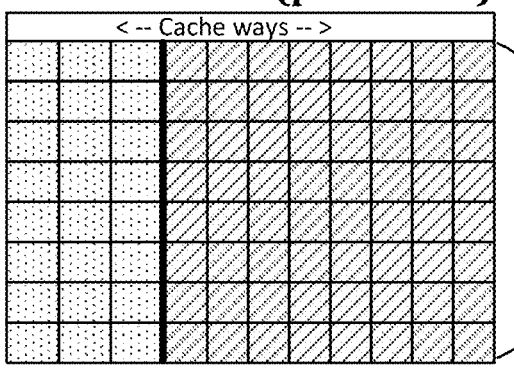
Allocation 420 (post-flush)
*FIG. 4*

Scheme 600
Allocation 610
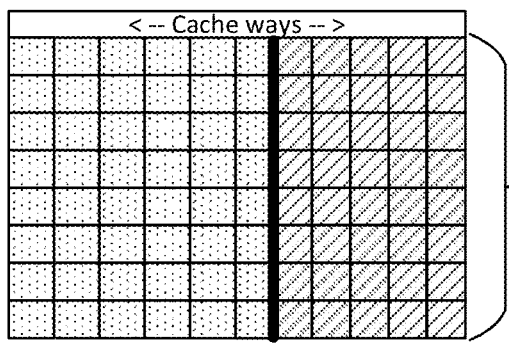
Allocation 620 (isolation)
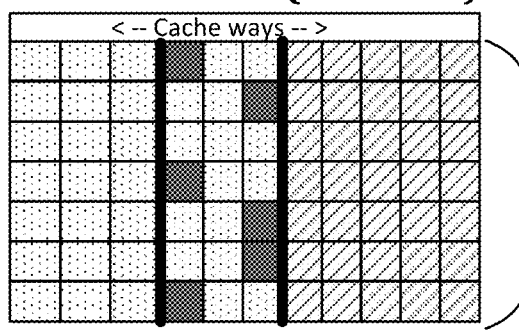
Allocation 620 (flush)
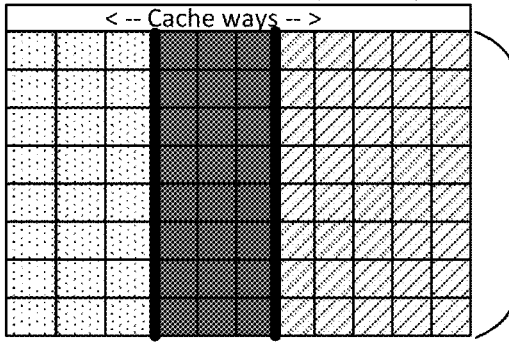
Allocation 630
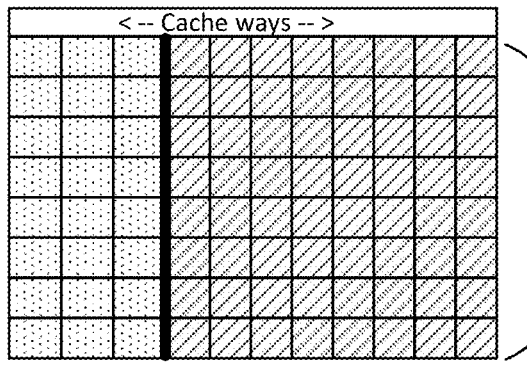
*FIG. 6*

Code 700

```
Procedure Clear_Cache_Regions(ways: array[1..20] of integer, num_ways: integer);
Var
    i: integer;
    save_clos: integer;
    tmp_clos: integer;
    tmp_array: array[1..size_of_cache_way] of Byte;
Begin
    save_clos := GET_CAT_CLASS();
    For i:=0 to num_ways-1 do
        Begin
            tmp_clos = 1 << ways[i];
            SET_CAT_CLASS(tmp_cos);
            WRITE_BYTES(tmp_array, size_of_cache_way);
            FLUSH_BYTES(tmp_array, size_of_cache_way);
        End;
    SET_CAT_CLASS(save_clos);
End
```

DETECT, AT A PROCESSOR CIRCUIT FOR A COMPUTING PLATFORM, THAT A FIRST APPLICATION EXECUTED BY A PROCESSOR HOSTED BY THE COMPUTING PLATFORM HAS BEEN REASSIGNED FROM A FIRST CLOS TO A SECOND CLOS, THE SECOND CLOS ALLOCATED LESS CACHE RESOURCES OF THE PROCESSOR COMPARED TO THE FIRST CLOS
902

DETECT THAT A SECOND APPLICATION EXECUTED BY THE PROCESSOR HAS BEEN REASSIGNED FROM A THIRD CLOS TO A FOURTH CLOS, THE FOURTH CLOS INCLUDING CACHE RESOURCES PREVIOUSLY ALLOCATED TO THE FIRST CLOS
904

CAUSING DATA BELONGING TO THE FIRST APPLICATION THAT REMAINS IN THE CACHE RESOURCES PREVIOUSLY ALLOCATED TO THE FIRST CLOS TO BE FLUSHED SUCH THAT ALL CACHE RESOURCES ALLOCATED TO THE FOURTH CLOS NO LONGER INCLUDE ANY DATA BELONGING TO THE FIRST APPLICATION
906

FIG. 9

Storage Medium *1000*

Computer Executable Instructions for 900

FIG. 10

TECHNIQUES TO MANAGE CACHE RESOURCE ALLOCATIONS FOR A PROCESSOR CACHE

TECHNICAL FIELD

Examples described herein are generally related to managing cache resource allocations associated with one or more class of service (CLOS) assignments for a processor cache.

BACKGROUND

A processor of a computing platform coupled to a network (e.g., in a datacenter) may be associated with various types of resources that may be allocated to an application, virtual machine (VM) or process hosted by the computing platform. The various types of resources may include, but are not limited to, central processing unit (CPU) cores, system memory such as random access memory, network bandwidth or processor cache (e.g., last level cache (LLC)). Performance requirements for the application that may be based on service level agreements (SLAs) or general quality of service (QoS) requirements may make it necessary to reserve or allocate one of more of these various types of resources to ensure SLAs and/or QoS requirements are met.

BRIEF DESCRIPTION OF THE DRAWINGS

FIG. 2 illustrates an example first scheme.
FIG. 4 illustrates an example second scheme.
FIG. 6 illustrates an example third scheme.
FIG. 7 illustrates an example code.
FIG. 9 illustrates an example of a logic flow.
FIG. 10 illustrates an example of a storage medium.

DETAILED DESCRIPTION

Figure 1:
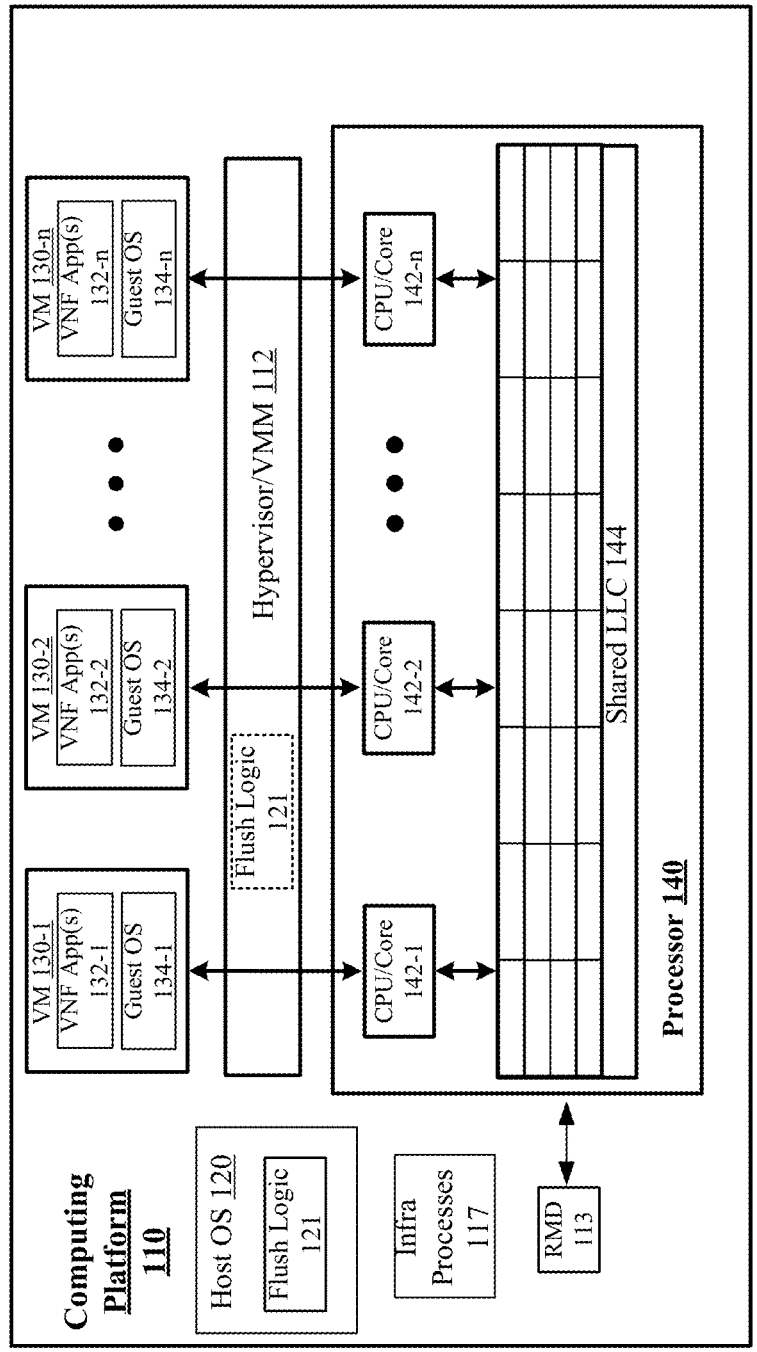
FIG. 1 illustrates an example system.

Relatively new technologies such as Intel® Resource Director Technology (RDT) allow for monitoring usage and allocation of processor cache that is mainly focused on defining cache classes of service (CLOS) and how to use bit masks such as capacity bitmasks (CBMs) to partition the processor cache to support the CLOS. In some implementations for these new technologies such as Intel® RDT, users may be able to use machine specific registers directly to partition the processor cache to support the CLOS. In other implementations, users may use kernel support such as Intel® developed Linux kernel support or access software libraries to assist in partitioning the processor cache to support the CLOS. An application, VM or process hosted by the computing platform may then be assigned to a CLOS and this assignment may enable use (sometimes exclusive use) of partitioned portions of the processor cache.

In some examples, a computing platform may be deployed in a network function virtualization (NFV) environment. For these examples, five CLOS may be established, and the five CLOS may be used to provide various levels of processor cache resources. For example, a critical CLOS, a high CLOS, a medium CLOS, a low CLOS and a best effort CLOS may be established that assigns a highest amount of cache resources to the critical CLOS and the lowest amount of cache resources to the best effort CLOS. Also, applications, VMs or processes hosted by the computing platform may be assigned to a CLOS based on relative importance of the applications, VMs or processes to support, for example, virtual network functions. For example, applications, VMs or processes supporting NFV infrastructure (e.g., a virtual switch) may be deemed as critical and thus assigned to the critical CLOS. Applications, VMs or processes associated with a deployed VNF that provides a key service (e.g., production VNF group) may be assigned to the high CLOS. Applications, VMs or processes associated with VNFs not ready for full deployment (e.g., pre-production VNF group) may be assigned to the medium CLOS. Applications, VMs or processes associated with VNFs under test (e.g., test VNF group) may be assigned to the low CLOS. Assignments to the best effort CLOS may be for applications, VMs or processes associated with VNFs that have a flexibility to run opportunistically (e.g., low SLA/QoS requirements).

According to some examples, a VNF having associated applications, VMs or processes assigned to the high CLOS may be not be performing as required for VNFs included in a production VNF group. For these examples, the VNF may be reassigned or demoted from the high CLOS to the medium CLOS. The demotion, for example, may reduce a first number of cache ways of an n-way set associative last level cache (LLC) allocated to the high CLOS to a second, lower number of cache ways allocated to the medium CLOS. However, after demoting the VNF, old data remains in the cache ways allocated to the high CLOS. The old data remaining in the cache ways allocated to the high CLOS may remain indefinitely if that data is frequently used by the VNF (having cache hits before cache evictions). Thus, even if reassigned to a lower CLOS the VNF still consumes higher CLOS resources. A solution to this occupying of higher CLOS resources is to flush all the cache ways allocated to the higher CLOS resources to remove data from the demoted VNF. However, this flushing of all cache ways for the higher CLOS impacts other VNFs, VMs or processes assigned to the higher CLOS and will require these other VNFs, VMs or processes to fetch data from outside the LLC. The fetching of data from outside the LLC will negatively impact performance of these other VNFs, VMs or processes.

FIG. 1 illustrates an example system 100. In some examples, as shown in FIG. 1, system 100 includes a computing platform 110. For these examples, computing platform 110 may be coupled to a network (not shown) and may be part of a datacenter that includes a plurality of interconnected computing platforms, servers or nodes included in the datacenter. These interconnected computing platforms, servers or nodes may provide network services to one or more clients or customers as part of a software defined network (SDN) or deployed as part of a European Telecommunications Standards Institute (ETSI) ETSI NFV infrastructure. Examples are not limited to a computing platform in a datacenter, SDN or ETSI NFV infrastructure, in some examples, computing platform may a stand alone computing platform or may be coupled to any other type of network.

According to some examples, computing platform 110 may be a node composed of disaggregated resources (i.e., a node comprised of compute resources from a compute sled, storage resources from a storage sled, accelerator resources from an accelerator sled) in a datacenter to support VMs separately executing one or more VNF applications as part of providing network services and/or a network function to clients or customers. The network services and/or network function may include, but are not limited to, a database network service/function, a website hosting network service/function, a routing network service/function, an e-mail network service/function, a firewalling service/function, a domain name service (DNS), a caching service/function, a network address translation (NAT) service/function or virus scanning network service. In some examples, VMs 130-1 to 130-*n* (where "n" represents any whole, positive integer greater than 1) and may be supported by composed computing resources associated with computing platform 110. VMs 130-1 to 130-*n* at computing platform 110 may be managed or controlled by a hypervisor/VM manager (VMM) such as hypervisor/VMM 112. In other examples, computing platform 110 may be configured as a more conventional server having the various above-mentioned computing resources contained within the same physical enclosure, chassis or container.

According to some examples, a virtual machine is a software computer that, like a physical computer, runs an operating system and applications. The virtual machine is comprised of a set of specification and configuration files and is backed by the physical resources of a host. Also, a hypervisor or VMM is computer software, firmware or hardware that creates and runs virtual machines. A computer on which a hypervisor runs one or more virtual machines is called a host machine, and each virtual machine is called a guest machine. The hypervisor or VMM presents the guest operating systems with a virtual operating platform and manages the execution of the guest operating systems. Multiple instances of a variety of operating systems may share the virtualized hardware resources: for example, Linux, Windows, and macOS instances can all run on a single physical processor with multiple cores. This contrasts with operating-system-level virtualization, where all instances (usually called containers) must share a single kernel, though the guest operating systems can differ in user space, such as different Linux distributions with the same kernel.

In some examples, as shown in FIG. 1, at least some of the composed computing resources for computing platform 110 may include processing elements such as CPU/cores 142-1 to 142-*n* having a shared last-level cache (LLC) 144. CPU/cores 142-1 to 142-*n* may have shared access to shared LLC 144 to support respective VMs 130-1 to 130-*n*, VNF applications (App(s)) 132-1 to 132-*n*, guest OSs 134-1 to 134-*n*, host OS 111 or infrastructure (Infra) processes 117. In some examples, the shared access to shared LLC 144 by CPU/cores 142-1 to 142-*n* may be allocated to various CLOS and the various CLOS may be assigned to VMs 130-1 to 130-*n*, VNF App(s) 132-1 to 132-*n*, guest OSs 134-1 to 134-*n*, host OS 111 or infrastructure (Infra) processes 117. The various CLOS may reflect how shared LLC 144 is partitioned to enable CPU/cores 142-1 to 142-*n* to support various workloads fulfilled by VMs 130-1 to 130-*n*, VNF App(s) 132-1 to 132-*n*, guest OSs 134-1 to 134-*n*, host OS 111 or Infra processes 117. The partitioning of shared LLC 144 may be based on, but is not limited to, such cache allocation technologies as Intel® Cache Allocation Technology (CAT). For example, Intel® CAT may use separate CLOS as a resource control tag via which VMs 130-1 to 130-*n*, VNF App(s) 132-1 to 132-*n*, guest OSs 134-1 to 134-*n*, host OS 111 or Infra processes 117 may be grouped and each CLOS may in turn have associated resource capacity bitmasks (CBMs) indicating how much of shared LLC 144 (e.g., number of cache ways) can be used by each CLOS. Examples are not limited to only a shared LLC and the partitioning of this type of processor cache, other types of processor cache in addition to LLC, whether shared or not shared, may be managed in similar ways as described in this disclosure.

As described in more detail below, logic and/or features of a flush logic 121 may facilitate implementing various cache flush schemes to flush one or more portions of shared LLC 144 responsive to changes to CLOS assignments. As shown in FIG. 1, flush logic 121 may be implemented as logic and/or features of host OS 121 or may also be implements as logic and/or features of hypervisor/VMM 112.

In some examples, infra processes 117 may include, but are not limited to, infrastructure processes such as an Open virtual switch (vSwitch). An Open vSwitch may be utilized by VMs 130-1 to 130-*n* for communication between these VMs or between VMs 130-1 to 130-*n* and/or other endpoints/VMs located on a separate computing platform. Other types of infrastructure processes may include use of data plane development kit (DPDK) libraries and network interface drivers for packet processing of data packets between VMs 130-1 to 130-*n* or between VMs 130-1 to 130-*n* and/or other endpoints/VMs located on a separate computing platform (e.g., coupled with computing platform 110 via a network connection through a network interface).

In some examples, a network interface card (NIC), (also known as a network adapter, a LAN adapter or a physical network interface, and by similar terms) is a computer hardware component that connects computing platform 110 to a network. Early network interface controllers were commonly implemented on expansion cards that plugged into a computer bus. A low cost and ubiquity of some technology standards such as the Ethernet standard means that most newer computers have a network interface built into the motherboard. Modern NICs offer advanced features such as interrupt and direct memory access (DMA) interfaces to host processors, support for multiple receive and transmit queues, partitioning into multiple logical interfaces, and on-controller network traffic processing such as a TCP offload engine.

According to some examples, a resource manager daemon (RMD) 113 may monitor usage of various resources of computing platform 110 such as processor cache usage by VMs 130-1 to 130-*n*, VNF App(s) 132-1 to 132-*n*, guest OSs 134-1 to 134-*n*, host OS 111 or Infra processes 117 as workloads associated with these various elements of computing platform 110 are supported by CPU/Cores 142-1 to 142-*n*.

In some examples, CPUs/cores 142-1 to 142-*n* may represent, either individually or collectively, various commercially available processors. The various commercially available processors may include, but are not limited to, processors designed to support or capable of supporting processor cache allocation technologies such as Intel® CAT including without limitation an Intel® Xeon® or Intel® Xeon Phi® processors; and similar processors.

According to some examples, shared LLC 144 may be types of relatively fast access memory to serve as a shared LLC for CPUs/cores 142-1 to 142-*n* to minimize access latency. The types of relatively fast access memory included in shared LLC 144 may include, but is not limited to, volatile or non-volatile types of memory. Volatile types of memory may include, but is not limited to, static random access memory (SRAM) or dynamic random access memory (DRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), or a combination of any of the above.

FIG. 2 illustrates an example scheme 200. In some examples, as shown in FIG. 2, scheme 200 may be for shared LLC 144 of computing platform 110 shown in FIG. 1. For these examples, shared LLC 144 may be an 11-way set associative LLC. Examples are not limited to an 11-way set associative LLC. Also, examples are not limited to cache ways for the partitioning or allocating of cache resources, other ways to partition/allocate cache resources may be used. For these examples, allocation 210 may include VNF App(s) 132-1 assigned to a first CLOS that has been allocated 6 of the 11 cache ways of shared LLC 144 and VNF App(s) 132-2 assigned to a second CLOS that has 5 of the 11 cache ways of shared LLC 144. Blocks of the 6 cache ways allocated to VNF App(s) 132-1 containing data used by VNF App(s) 132-2 are shown as dot-filled blocks. Blocks of the 5 cache ways allocated to VNF App(s) 132-2 containing data used by VNF App(s) 132-1 are shown as diagonal-line blocks.

According to some examples, a change in workload priorities for VNF App(s) 132-1 and/or VNF App(s) 132-2 may result in allocation 220. The change in workload priorities may require that more cache resources be allocated for use by VNF App(s) 132-2 and less for VNF App(s) 132-1. For these examples, allocation 220 may reflect a formation of a third CLOS assigned to VNF App(s) 132-1 that now has a reduced number of 3 of the 11 cache ways of shared LLC 144 and a fourth CLOS assigned to VNF App(s) 132-2 that now has an increased number of 8 of 11 cache ways of shared LLC 144. However, at least some data used by VNF App(s) 132-1 is still sitting in a substantial number of blocks in the 3 cache ways of LLC previously allocated to the first CLOS. This remaining data in the 3 cache ways may remain because it may be commonly used by VNF App(s) 132-1 and thus may never get evicted from these 3 cache ways. Thus, although workload priorities changed to cause VNF App(s) 132-2 to have more allocated cache ways, the remaining occupancy of the data for VNF App(s) 132-1 may not result in a desired increase in available cache resources. As described more below, logic and/or features implemented at host OS 120 and/or hypervisor/VMM 112 may implement various schemes to selectively flush data from VNF App(s) 132-1 remaining in reallocated cache ways with little or a reduced impact to VNF App(s) 132-2.

Figure 3:
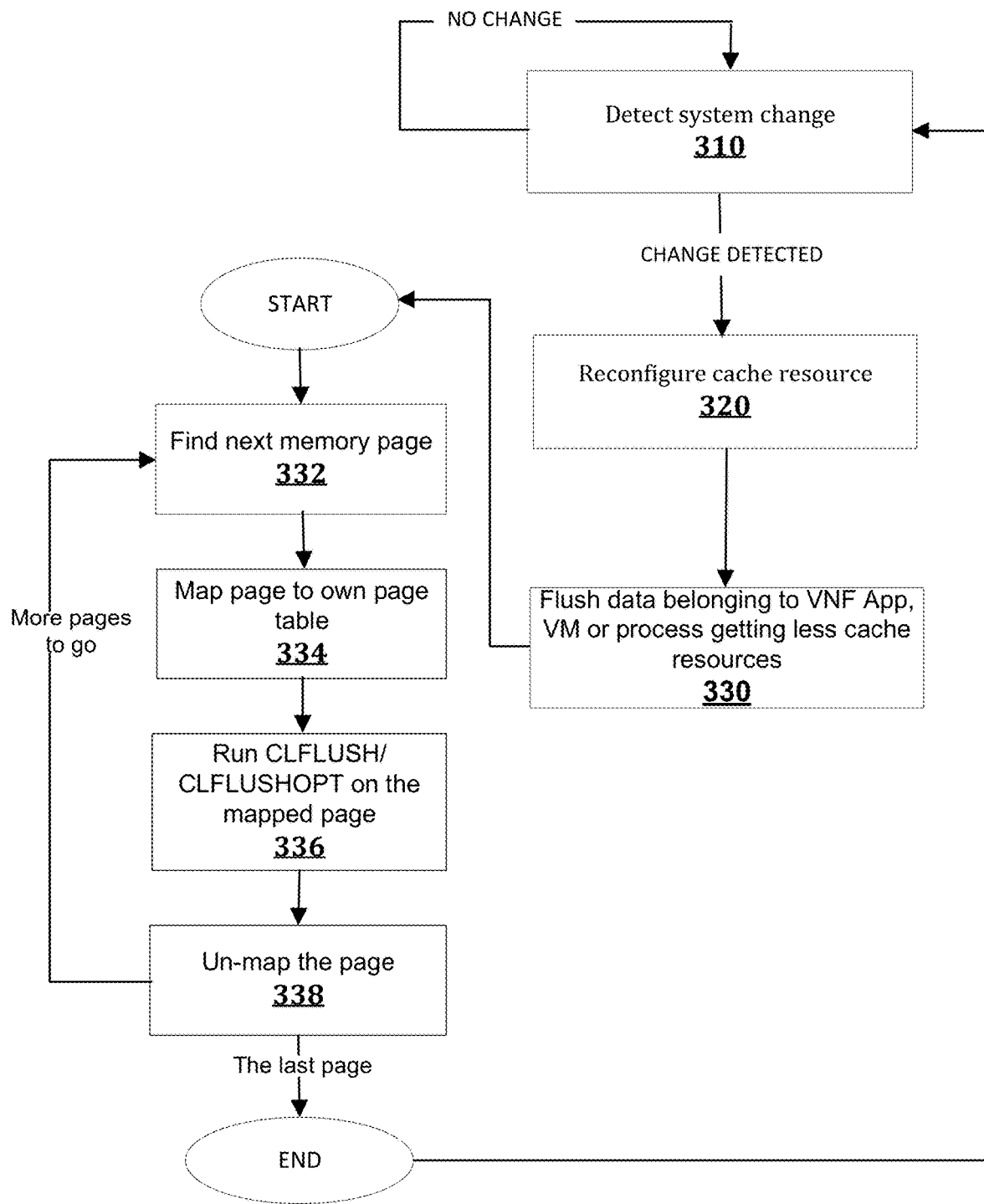
FIG. 3 illustrates an example first flow.

FIG. 3 illustrates an example flow 300. In some examples, flow 300 may represent a flow for flushing cache content of a specific VNF application, VM or process hosted by a computing platform. For these examples, elements of system 100 as shown in FIG. 1, may be related to flow 300. These elements of system 100 may include elements of computing platform 110 such as flush logic 121 of host OS 120 and/or hypervisor/VMM 112. The elements of system 100 may also include VNF App(s) 132-1 and 132-2 supported by CPU/cores 142-1 and 142-2 that utilize shared LLC 144 to support these VNF Apps. However, example flow 300 is not limited to implementations using elements of system 100 shown in FIG. 1.

FIG. 4 illustrates an example scheme 400 related to flow 300. Similar to allocation 210 shown in FIG. 2, a first allocation 410 may include VNF App(s) 132-1 assigned to a first CLOS that has been allocated 6 of the 11 cache ways of shared LLC 144 and VNF App(s) 132-2 assigned to a second CLOS that has 5 of the 11 cache ways of shared LLC 144. Blocks of the 6 cache ways allocated to VNF App(s) 132-1 containing data used by VNF App(s) 132-2 are shown as dot-filled blocks. Blocks of the 5 cache ways allocated to VNF App(s) 132-2 containing data used by VNF App(s) 132-1 are shown as diagonal-line blocks. Examples are not limited to an allocation of cache ways to only two VNF applications. Allocations are shown to just VNF App(s) 132-1 and VNF App(s) 132-2 for ease of describing how allocations can be reconfigured and previous allocations flushed of data.

According to some examples, logic and/or features of flush logic 121 may determine at 310 of flow 300 whether any system changes have been detected that may result in a reconfiguration of the first and second CLOS assigned to respective VNF App(s) 132-1 and 132-2. For example, workload priority changes or a need to reduce cache resources allocated to VNF App(s) 132-1 due to poor performance that may have caused VNF App(s) 132-1 to be downgraded in importance. The detection of the reassignment and/or reconfiguration may be based on receiving an indication from host OS 120 or hypervisor/VMM 112 that processor cache resources included in shared LLC 144 are to be reconfigured.

In some examples, host OS 111 and/or hypervisor/VMM 112 at 320 of flow 300 may cause cache resources to be reconfigured based on a detected system change. The reconfiguration of cache resources may result in allocation 420 for the cache ways of shared LLC 144. Thus, as shown in FIG. 4, VNF App(s) 132-1 may now be assigned to a third CLOS that is allocated only 3 cache ways and VNF App(s) 132-2 may now be assigned to a fourth CLOS that is allocated 8 cache ways. However, data used by VNF App(s) 132-1 still remains in 3 of the cache ways reallocated to VNF App(s) 132-2. This is depicted in FIG. 4 as allocation 420 (pre-flush).

According to some examples, logic and/or features of flush logic 121 may flush all data belonging to VNF App, VM or process getting less cache resources at 330 of flow 300. For these examples, the logic and/or features of flush logic 121 flush all the data used by VNF App(s) 132-1 from the 6 cache ways once allocated to VNF App(s) 132-1 for the first CLOS. For these examples, the flushing of all the data may be done by flush logic 121 traversing VNF App(s) 132-1's page table a memory page at a time as shown in 332 of flow 300, then separately map each of VNF App(s) 132-1's memory pages to a page table used by flush logic 121 as shown at 334 of flow 300 and then flushing targeted memory regions as shown in 336 of flow 300. For example, a cache line flush (CLFLUSH)/CLFLUSH operation (CLFLUSHOPT) may be completed at each traversed page responsive to the logic and/or features of flush logic 121 sending CLFLUSH/CLFLUSHOPT instructions to processor 140 for the targeted memory regions. Flush logic 121 may then un-map each of the traversed memory pages of VNF App(s) 132-1 page table at 338 of flow 300 and after the last memory page is un-mapped from the traversed page table, flushing ends. In some examples, allocation 420 (flush) shows in FIG. 4 that all data from VNF App(s) 132-1 has been flushed from shared LLC 144. Following the flush, VNF App(s) 132-1 may fill the 3 cache ways with data as shown by allocation 420 (post-flush).

According to some examples, 332-336 of flow 300 may be implemented by a dedicated device such as a direct memory access (DMA) engine or circuitry coupled with shared LLC 144. The DMA engine or circuitry may have similar types of block memory management capabilities as described above for flush logic 121 in order to flush the memory pages of VNF App(s) 132-*s* page table.

In an example where host OS 111 is a Linux OS, the operation of traversing VNF App(s) 132-1's page table and flushing memory pages may be parametrized and can be carried out on targeted memory regions. For the Linux OS example, targeted memory regions for VNF App(s) 132-1 may include code (program), data (program's data section), basic service set (BSS) (program's BSS section), stack (dynamically allocated data and the call stack), heap (dynamically allocated data (e.g., brk syscall) or anonymous pages (dynamically allocated data (e.g., memmap syscall). Examples are not limited to the above-mentioned targeted memory regions for flushing data from cache ways or other types of cache resource partitioning.

According to some examples, flush operations following 332-338 of flow 300 may be implemented periodically, even if a reconfiguration of cache resources for shared LLC 144 is not initiated. For these examples, a VNF application, VM or process may have targeted memory regions flushed to change a balance of cache utilization and/or to penalize VNF applications, VMs or processes for consuming too much cache resources.

Figure 5:
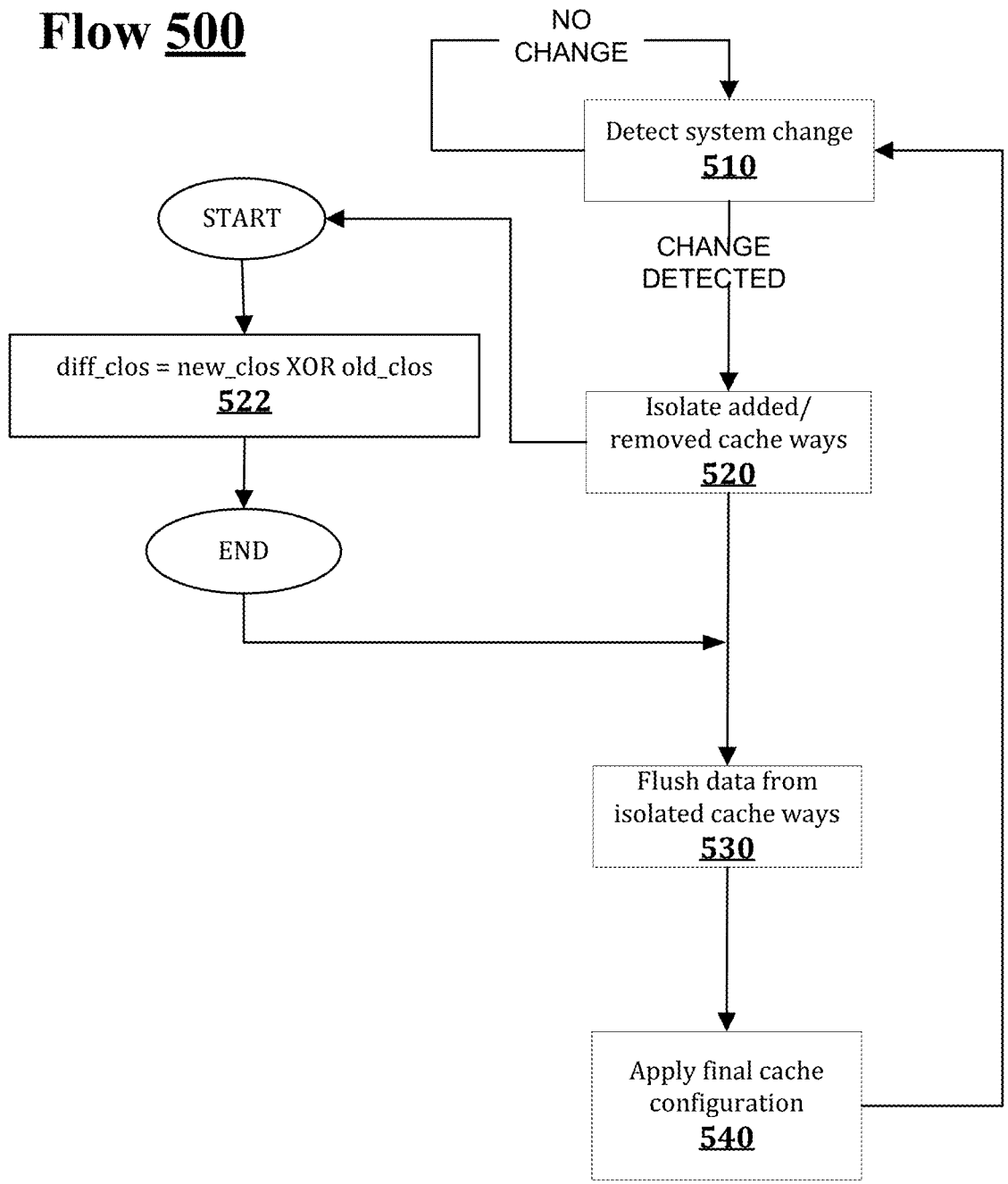
FIG. 5 illustrates an example second flow.

FIG. 5 illustrates an example flow 500. In some examples, flow 500 may represent a flow that includes an intermediate cache way reconfiguration to facilitate flushing cache content of a specific VNF application, VM or process hosted by a computing platform. For these examples, elements of system 100 as shown in FIG. 1, may be related to flow 500. These elements of system 100 may include elements of computing platform 110 such as a flush logic 121 of host OS 120 and/or hypervisor/VMM 112. The elements of system 100 may also include VNF App(s) 132-1 and 132-2 supported by CPU/cores 142-1 and 142-2 that utilize shared LLC 144 to support these VNF Apps. However, example flow 500 is not limited to implementations using elements of system 100 shown in FIG. 1.

FIG. 6 illustrates an example scheme 600 related to flow 500. Similar to allocation 210 shown in FIG. 2 and allocation 410 shown in FIG. 4, a first allocation 610 may include VNF App(s) 132-1 assigned to a first CLOS that has been allocated 6 of the 11 cache ways of shared LLC 144 and VNF App(s) 132-2 assigned to a second CLOS that has 5 of the 11 cache ways of shared LLC 144.

According to some examples, logic and/or features of flush logic 121 may determine at 510 of flow 500 whether any system changes have been detected that may result in a reassignment and/or reconfiguration of the first and second CLOS assigned to respective VNF App(s) 132-1 and 132-2. For example, a system change may include a reconfiguration of allocated cache ways that may result in VNF App(s) 132-1 being reduced from 6 to 3 cache ways and VNF App(s) 132-2 being increased from 5 to 8 cache ways.

In some examples, based on a detected system change, logic and/or features of flush logic 121 at 520 of flow 500 may isolate the three cache ways of shared LLC 144 that were removed from VNF App(s) 132-1's allocation and added to VNF App(s) 132-2's allocation. Allocation 620 (isolation) in FIG. 6 shows an example isolation of the 3 cache ways of shared LLC 144. The logic and/or features of flush logic 121 at 522 of flow 500 may isolate the 3 cache ways by generating an intermediate or different CLOS (diff_clos) configuration by performing a binary XOR function that has as inputs an old CLOS (old_clos) configuration (CLOS before reconfiguration) and a new CLOS (new_clos) configuration. The 3 cache ways between the thick vertical lines for allocation 420 show this diff_clos configuration that includes the isolated cache ways.

In some examples, VNF App(s) 132-1 may still have access to data included in the isolated cache ways. Also, an example code (described more below) may be implemented by logic and/or features of flush logic 121 to initiate and complete flushing of data from the isolated cache ways. The grey shaded boxes in allocation 620 (isolation) represent data identified for flushing by the example code that may be flushed while VNF App(s) 132-1 still has access to the isolated cache ways.

According to some examples, logic and/or features of flush logic 121 at 530 of flow 500 may flush all data from the isolated cache ways. For these examples, the grey shaded boxes shown in FIG. 6 for allocation 620 may represent how all the isolated cache ways can be flushed by the example code and also show that VNF App(s) 132-1 is no longer allowed to have data in these isolated cache ways. Also, VNF App(s) 132-2 does not yet have access to these 3 cache ways.

In some examples, logic and/or features of flush logic 121 may apply a final cache configuration for shared LLC 144 at 540 of flow 500. For these examples, allocation 630 shows the final cache configuration for shared LLC 144 that shows 3 cache ways allocated to VNF App(s) 132-1 and 8 cache ways allocated to VNF App(s) 132-2. Allocation 630 also shows how VNF App(s) 132-2 now has access to the once isolated cache ways and has filled these cache ways with its data.

The flushing of data via use of an isolated region of cache ways as described for flow 500 may be less disruptive to VNF App(s) 131-1 and 132-2 compared to the flow 300. However, in an example CLOS where multiple VNF applications, VMs or processes may have shared or overlapping cache allocations, isolating shared cache ways may result in an unacceptable amount of disruption. Thus, for shared cache ways, flow 300 may be the less disruptive solution compared to flow 500.

FIG. 7 illustrates an example code 700. In some examples, as mentioned briefly above, logic and/or features of flush logic 121 may implement an example code to flush isolated cache ways. Code 700 may be a pseudo code for simplistic cache region clear or flush and then an establishment of a new, reconfigured CLOS. The simplistic cache region clear includes a sequence of cache way clears or flushes until all cache ways in an isolated memory region are clear or flushed. For these examples, code 700 is assumed to be implemented with Intel® CAT technologies. For code 700, a "size_of_cache_way" may be determined based on product/model specific information for a given processor that indicates a number of n-way associative LLC for the given processor. The principle of operation for code 700 is to (1) select cache way, (2) write into the selected cache way, (3) flush the selected cache way, and (4) revert cache access setting.

In some examples, the input arguments for code 700 include "ways" that represent an array of cache way numbers to be flushed and "num_ways" that represent number of valid cache way numbers in the array. Procedures called from within code 700 may include "SET_CAT_CLASS( )"

that sets currently used Intel® CAT cache access mark, "GET_CAT_CLASS( )" that retrieves currently used Intel® CAT cache access mask, "WRITE_BYTES( )" that writes random values into array of given size, and "FLUSH_BYTES( )"—that flushes selected region of memory from cache hierarchy (a processor instruction such as CLFLUSH or CLFLUSHOPT may be used for the FLUSH_Bytes( ) procedure).

According to some examples, as shown in FIG. 7 for code 700, the variable (Var) for the "Procedure Clear_Cache_Region(ways: array[1 . . . 20] of integer, num_ways: integer)" includes i: integer; save_clos: integer; tmp_clos: integer; and temp_array: array[1 . . . size_of_cache_way] of Byte. For these examples, "save_clos" may represent how the cache ways of an LLC are to be allocated after reconfiguration and "tmp_clos" may represent the isolated cache ways to be flushed or cleared. Also, "temp_array: array[1 . . . size_of_cache_way] of Byte" may represent an array address alignment required for the procedure implemented by code 700.

In some examples, the procedure implemented by code 700 begins with "save_clos: =GET_CAT_CLASS( )" which saves the current, reconfigured LLC configuration. Then code 700 includes a sequence of cache way clears or flushes of cache ways included in "tmp_clos" until all cache ways in this isolated memory region are cleared or flushed. "WRITE_BYTES(tmp_array, size_of_cache_way)" writes an amount of data that fills a cache way and "FLUSH_BYTES(tmp_array, size_of_cache_way)" flushes the data that was filled for the cache way. Code 700 then ends after "SET_CAT_CLASS(save_clos)" causes the current, reconfigured LLC configuration to be restored.

Figure 8:
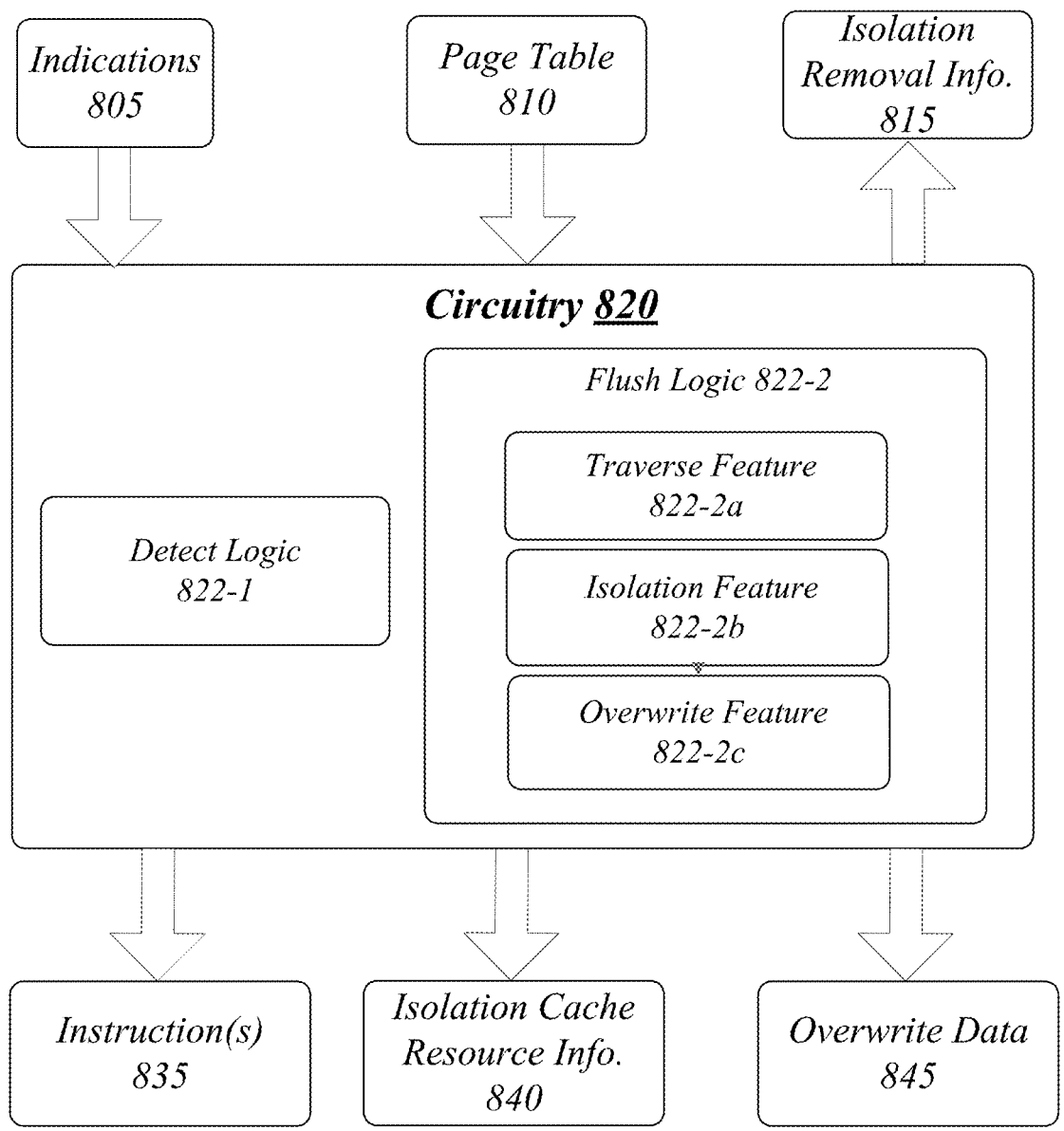
FIG. 8 illustrates an example block diagram for an apparatus.

FIG. 8 illustrates an example block diagram for apparatus 800. Although apparatus 800 shown in FIG. 8 has a limited number of elements in a certain topology, it may be appreciated that the apparatus 800 may include more or less elements in alternate topologies as desired for a given implementation.

According to some examples, apparatus 800 may be supported by circuitry 820. For these examples, circuitry 820 may be at an ASIC, FPGA, configurable logic, processor, processor circuit, CPU, or core of a CPU for a computing platform, e.g., computing platform 110 shown in FIG. 1. For these examples, the ASIC, FPGA, configurable logic, processor, processor circuit, CPU, or one or more cores of a CPU may support logic and/or features of a flush logic such as flush logic 121 to facilitate flushing of reassigned portions of processor cache allocations for a processor hosted by a computing platform such as computing platform 110. The computing platform hosting the processor may also host apparatus 800. Circuitry 820 may be arranged to execute one or more software or firmware implemented modules, components or logic 822-a (module, component or logic may be used interchangeably in this context). It is worthy to note that "a" and "b" and "c" and similar designators as used herein are intended to be variables representing any positive integer. Thus, for example, if an implementation sets a value for a=2, then a complete set of software or firmware for modules, components or logic 822-a may include logic 822-1 or 822-2. The examples presented are not limited in this context and the different variables used throughout may represent the same or different integer values. Also, "logic", "module" or "component" may also include software/firmware stored in computer-readable media, and although types of logic are shown in FIG. 8 as discrete boxes, this does not limit these types of logic to storage in distinct computer-readable media components (e.g., a separate memory, etc.).

According to some examples, as mentioned above, circuitry 820 may include an ASIC, an FPGA, a configurable logic, a processor, a processor circuit, a CPU, or one or more cores of a CPU. Circuitry 820 may be generally arranged to execute one or more software components 822-a. Circuitry 820 may be all or at least a part of any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors.

According to some examples, apparatus 800 may include detect logic 822-1. Detect logic 822-1 may be executed by circuitry 820 to detect that a first application executed by a processor hosted by a computing platform that also hosts apparatus 800 has been reassigned from a first CLOS to a second CLOS, the second CLOS allocated less cache resources of the processor compared to the first CLOS. Detect logic 822-1 may also detect that a second application executed by the processor has been reassigned from a third CLOS to a fourth CLOS, the fourth CLOS to include cache resources previously allocated to the first CLOS. For these examples, the detection may be based on in indications 805 that may indicate the reassignment of CLOSs.

In some examples, apparatus 800 may include a flush logic 822-2. Flush logic 822-2 may be executed by circuitry 820 to cause data belonging to the first application that remains in the cache resources previously allocated to the first CLOS to be flushed such that all cache resources allocated to the fourth CLOS no longer include any data that belongs to the first application. In some examples, flush logic 822-2 may send instructions included in instruction(s) 835 to the processor to cause the data to be flushed (e.g., CLFLUSH/CLFUSHOPT instructions).

According to some examples, flush logic 822-2 may include a traverse feature 822-2a. Traverse feature 822-2a may traverse a page table of the first application to identify each memory page mapped to the cache resources previously allocated to the first CLOS and cause each memory page to be flushed to facilitate flush logic 822-2's causing of the data belonging to the first application that remains in cache resources previously allocated to the first CLOS to be flushed. For these examples, page table 810 may be the page table traversed by traverse feature 822-2a.

In some examples, flush logic 822-2 may also include an isolation feature 822-2b and an overwrite feature 822-2c. For these examples, isolation feature 822-2b may facilitate an isolation of the cache resources previously allocated to the first CLOS such that the second application does not have access to the isolated cache resources allocated to the fourth CLOS and then overwrite feature 822-2c may cause all data in the isolated cache resources to be overwritten with random values. Overwrite data 845 may include the random values. Flush logic 822-2 may then cause the data in the isolated cache resources to be flushed. Isolate cache resources information 840 may be provided to the second application by isolation feature 822-b to indicate isolation of at least a portion of the cache resources allocated to the fourth CLOS. Following flushing of the data isolation removal information 815 may be provided to the second application by isolation feature 822-b to indicate removal of the isolation of the at least a portion of the cache resources allocated to the fourth CLOS.

Various components of apparatus 800 and a device or node implementing apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 9 illustrates an example logic flow 900. Logic flow 900 may be representative of some or all of the operations executed by one or more logic, features, or devices described herein, such as apparatus 900. More particularly, logic flow 900 may be implemented by at least detect logic 822-1 or flush logic 822-2.

According to some examples, logic flow 900 at block 902 may detect, at a processor circuitry for the computing platform, that a first application executed by a processor hosted by the computing platform has been reassigned from a first class of service (CLOS) to a second CLOS, the second CLOS allocated less cache resources of the processor compared to the first CLOS. For these examples, detect logic 822-1 may detect the reassignment related to the first application.

In some examples, logic flow 900 at block 904 may detect that a second application executed by the processor has been reassigned from a third CLOS to a fourth CLOS, the fourth CLOS including cache resources previously allocated to the first CLOS. For these examples, detect logic 822-1 may the reassignment related to the second application.

According to some examples, logic flow 900 at block 906 may cause data belonging to the first application that remains in the cache resources previously allocated to the first CLOS to be flushed such that all cache resources allocated to the fourth CLOS no longer include any data belonging to the first application. For these examples, flush logic 822-2 may cause the data to be flushed.

FIG. 10 illustrates an example storage medium 1000. As shown in FIG. 10, the first storage medium includes a storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
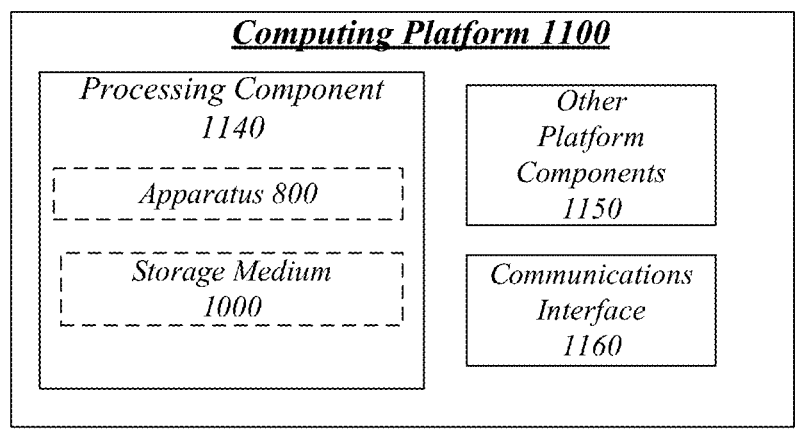
FIG. 11 illustrates an example computing platform.

FIG. 11 illustrates an example computing platform 1100. In some examples, as shown in FIG. 11, computing platform 1100 may include a processing component 1140, other platform components 1150 or a communications interface 1160. According to some examples, computing platform 1100 may be similar to computing platform 110 shown in FIG. 1. Similar to computing platforms 110, computing platform 1100 may be capable of coupling to a network and may be part of a datacenter including a plurality of network connected computing platforms.

According to some examples, processing component 1140 may execute processing operations or logic for apparatus 800 and/or storage medium 1000. Processing component 1140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays that may be locally or remotely coupled to computing platform 1100), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification.

As mentioned above computing platform 1100 may be implemented in a server of a datacenter. Accordingly, functions and/or specific configurations of computing platform 1100 described herein, may be included or omitted in various embodiments of computing platform 1100, as suitably desired for a server deployed in a datacenter.

The components and features of computing platform 1100 may be implemented using any combination of discrete circuitry, ASICs, logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

The following examples pertain to additional examples of technologies disclosed herein.

Example 1

An example apparatus may include circuitry at a computing platform. For this example, the circuitry may execute logic to detected that a first application executed by a processor hosted by the computing platform has been reassigned from a first CLOS to a second CLOS, the second CLOS allocated less cache resources of the processor compared to the first CLOS. The logic may also detect that a second application executed by the processor has been reassigned from a third CLOS to a fourth CLOS, the fourth CLOS to include cache resources previously allocated to the first CLOS. The logic may also cause data belonging to the first application that remains in the cache resources previously allocated to the first CLOS to be flushed such that all cache resources allocated to the fourth CLOS no longer include any data that belongs to the first application.

Example 2

The apparatus of example 1, the allocated cache resources may be allocated from an n-way set associative LLC for the processor, where "n" is any whole, positive number greater than 1.

Example 3

The apparatus of example 1, the logic to cause the data that belongs to the first application to be flushed includes the logic to traverse a page table of the first application to identify each memory page mapped to the cache resources previously allocated to the first CLOS and cause each memory page to be flushed.

Example 4

The apparatus of example 3, logic may also send a CLFLUSH/CLFLUSHOPT instruction to the processor for each memory page mapped to the cache resources to cause each memory page to be flushed.

Example 5

The apparatus of example 1, the logic to cause the data that belongs to the first application to be flushed may include the logic to isolate the cache resources previously allocated to the first CLOS such that the second application does not have access to the isolated cache resources allocated to the fourth CLOS. The logic may also cause all data in the isolated cache resources to be overwritten with random values. The logic may also cause all the data in the isolated cache resources to be flushed and remove the isolation of the cache resources to allow the second application to have access to all cache resources allocated to the fourth CLOS.

Example 6

The apparatus of example 5 may also include the logic to send a CLFLUSH/CLFLUSHOPT instruction to the processor to cause all the data in the isolated cache resources to be flushed.

Example 7

The apparatus of example 1, the first application may be a VNF application to fulfill a workload as part of providing a network service.

Example 8

The apparatus of example 7, the network service may be a database network service, a website hosting network service, a routing network service, an e-mail network service, a firewalling service, DNS, a caching service, a NAT service or virus scanning network service.

Example 9

The apparatus of example 1 may include a digital display remotely coupled to the circuitry to present a user interface view.

Example 10

An example method may include detecting, at a processor circuit for a computing platform, that a first application executed by a processor hosted by the computing platform has been reassigned from a first CLOS to a second CLOS. The second CLOS may be allocated less cache resources of the processor compared to the first CLOS. The method may also include detecting that a second application executed by the processor has been reassigned from a third CLOS to a fourth CLOS, the fourth CLOS including cache resources previously allocated to the first CLOS. The method may also include causing data belonging to the first application that remains in the cache resources previously allocated to the first CLOS to be flushed such that all cache resources allocated to the fourth CLOS no longer include any data belonging to the first application.

Example 11

The method of example 10, the allocated cache resources may be allocated from an n-way set associative LLC for the processor, where "n" is any whole, positive number greater than 1.

Example 12

The method of example 10, causing the data belonging to the first application to be flushed may include traversing a page table of the first application to identify each memory page mapped to the cache resources previously allocated to the first CLOS and cause each memory page to be flushed.

Example 13

The method of example 12 may also include sending a CLFLUSH/CLFLUSHOPT instruction to the processor for each memory page mapped to the cache resources to cause each memory page to be flushed.

Example 14

The method of example 10, causing the data belonging to the first application to be flushed may include isolating the cache resources previously allocated to the first CLOS such that the second application does not have access to the isolated cache resources allocated to the fourth CLOS, overwriting all data in the isolated cache resources, causing all the data in the isolated cache resources to be flushed, and removing the isolation of the cache resources to allow the second application to have access to all cache resources allocated to the fourth CLOS.

Example 15

The method of example 14 may also include sending a CLFLUSH/CLFLUSHOPT instruction to the processor to cause all the data in the isolated cache resources to be flushed.

Example 16

The method of example 10, the first application may be a VNF application to fulfill a workload as part of providing a network service.

Example 17

The method of example 16, the network service may be a database network service, a website hosting network service, a routing network service, an e-mail network service, a firewalling service, DNS, a caching service, a NAT service or virus scanning network service.

Example 18

An example at least one machine readable medium may include a plurality of instructions that in response to being executed by a system may cause the system to carry out a method according to any one of examples 10 to 17.

Example 19

An example apparatus may include means for performing the methods of any one of examples 10 to 17.

Example 20

An example at least one machine readable medium may include a plurality of instructions that in response to being executed by a system at a computing platform may cause the system to detect that a first application executed by a processor hosted by the computing platform has been reassigned from a first CLOS to a second CLOS. The second CLOS may be allocated less cache resources of the processor compared to the first CLOS. The instructions may also cause the system to detect that a second application executed by the processor has been reassigned from a third CLOS to a fourth CLOS, the fourth CLOS to include cache resources previously allocated to the first CLOS. The instructions may also cause the system to cause data belonging to the first application that remains in the cache resources previously allocated to the first CLOS to be flushed such that all cache resources allocated to the fourth CLOS no longer include any data that belongs to the first application.

Example 21

The at least one machine readable medium of example 20, the allocated cache resources may be allocated from an n-way set associative LLC for the processor, where "n" is any whole, positive number greater than 1.

Example 22

The at least one machine readable medium of example 20, the instructions to cause the system to cause the data that belongs to the first application to be flushed may include the instructions to further cause the system to traverse a page table of the first application to identify each memory page mapped to the cache resources previously allocated to the first CLOS and cause each memory page to be flushed.

Example 23

The at least one machine readable medium of example 21, the instructions may further cause the system to send a CLFLUSH/CLFLUSHOPT instruction to the processor for each memory page mapped to the cache resources to cause each memory page to be flushed.

Example 24

The at least one machine readable medium of example 23, the instructions to cause the data that belongs to the first application to be flushed may further cause the system to isolate the cache resources previously allocated to the first CLOS such that the second application does not have access to the isolated cache resources allocated to the fourth CLOS. The instructions may also further cause the system to cause all data in the isolated cache resources to be overwritten with random values. The instructions may also further cause the system to cause all the data in the isolated cache resources to be flushed and remove the isolation of the cache resources to allow the second application to have access to all cache resources allocated to the fourth CLOS.

Example 25

The at least one machine readable medium of example 21, the instructions may further cause the system to send a CLFLUSH/CLFLUSHOPT instruction to the processor to cause all the data in the isolated cache resources to be flushed.

Example 26

The at least one machine readable medium of example 25, the first application may be a VNF application to fulfill a workload as part of providing a network service.

Example 27

The at least one machine readable medium of example 26, the network service may be a database network service, a website hosting network service, a routing network service, an e-mail network service, a firewalling service, DNS, a caching service, a NAT service or virus scanning network service.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry at a computing platform, the circuitry to execute logic to:
     detect that a first application executed by a processor hosted by the computing platform has been reassigned from a first class of service (CLOS) to a second CLOS, the second CLOS allocated less cache resources of the processor compared to the first CLOS;
     detect that a second application executed by the processor has been reassigned from a third CLOS to a fourth CLOS, the fourth CLOS to include cache resources previously allocated to the first CLOS; and
     cause only data belonging to the first application that remains in the cache resources previously allocated to the first CLOS to be flushed such that all cache resources allocated to the fourth CLOS no longer include any data that belongs to the first application,
     wherein to cause the data belonging to the first application to be flushed comprises the circuitry to:
       isolate the cache resources previously allocated to the first CLOS such that the second application does not have access to the isolated cache resources allocated to the fourth CLOS;
       overwrite all data in the isolated cache resources;
       cause all the data in the isolated cache resources to be flushed; and
       remove the isolation of the cache resources to allow the second application to have access to all cache resources allocated to the fourth CLOS.

2. The apparatus of claim 1, comprising the allocated cache resources allocated from an n-way set associative last level cache (LLC) for the processor, where "n" is any whole, positive number greater than 1.

3. The apparatus of claim 1, further comprising the logic to:
   cause all data in the isolated cache resources to be overwritten with random values before all the data in the isolated cache resources is caused to be flushed.

4. The apparatus of claim 1, further comprising the logic to:
   send a cache line flush (CLFLUSH)/CLFLUSH operation (CLFLUSHOPT) instruction to the processor to cause all the data in the isolated cache resources to be flushed.

5. The apparatus of claim 1, the first application comprising a virtual network function (VNF) application to fulfill a workload as part of providing a network service.

6. The apparatus of claim 5, the network service comprising a database network service, a website hosting network service, a routing network service, an e-mail network service, a firewalling service, a domain name service (DNS), a caching service, a network address translation (NAT) service or virus scanning network service.

7. The apparatus of claim 1, comprising a digital display remotely coupled to the circuitry to present a user interface view.

8. A method comprising:
   detecting, at a processor circuit for a computing platform, that a first application executed by a processor hosted by the computing platform has been reassigned from a first class of service (CLOS) to a second CLOS, the second CLOS allocated less cache resources of the processor compared to the first CLOS;
   detecting that a second application executed by the processor has been reassigned from a third CLOS to a fourth CLOS, the fourth CLOS including cache resources previously allocated to the first CLOS; and
   causing data belonging to the first application that remains in the cache resources previously allocated to the first CLOS to be flushed such that all cache resources allocated to the fourth CLOS no longer include any data belonging to the first application,
   wherein causing the data belonging to the first application to be flushed comprises:
     isolating the cache resources previously allocated to the first CLOS such that the second application does not have access to the isolated cache resources allocated to the fourth CLOS;
     overwriting all data in the isolated cache resources;
     causing all the data in the isolated cache resources to be flushed; and
     removing the isolation of the cache resources to allow the second application to have access to all cache resources allocated to the fourth CLOS.

9. The method of claim 8, comprising the allocated cache resources allocated from an n-way set associative last level cache (LLC) for the processor, where "n" is any whole, positive number greater than 1.

10. The method of claim 8, further comprising:
    causing all data in the isolated cache resources to be overwritten with random values before all the data in the isolated cache resources is caused to be flushed.

11. The method of claim 8, comprising:
    sending a cache line flush (CLFLUSH)/CLFLUSH operation (CLFLUSHOPT) instruction to the processor to cause all the data in the isolated cache resources to be flushed.

12. The method of claim 8, the first application comprising a virtual network function (VNF) application to fulfill a workload as part of providing a network service.

13. The method of claim 12, the network service comprising a database network service, a website hosting network service, a routing network service, an e-mail network service, a firewalling service, a domain name service (DNS), a caching service, a network address translation (NAT) service or virus scanning network service.

14. At least one non-transitory machine readable medium comprising a plurality of instructions that in response to being executed by a system at a computing platform cause the system to:
   detect that a first application executed by a processor hosted by the computing platform has been reassigned from a first class of service (CLOS) to a second CLOS, the second CLOS allocated less cache resources of the processor compared to the first CLOS;
   detect that a second application executed by the processor has been reassigned from a third CLOS to a fourth CLOS, the fourth CLOS to include cache resources previously allocated to the first CLOS; and
   cause only data belonging to the first application that remains in the cache resources previously allocated to the first CLOS to be flushed such that all cache resources allocated to the fourth CLOS no longer include any data that belongs to the first application,
   wherein to cause the data belonging to the first application to be flushed comprises the system to:
      isolate the cache resources previously allocated to the first CLOS such that the second application does not have access to the isolated cache resources allocated to the fourth CLOS;
      overwrite all data in the isolated cache resources;
      cause all the data in the isolated cache resources to be flushed; and
      remove the isolation of the cache resources to allow the second application to have access to all cache resources allocated to the fourth CLOS.

15. The at least one non-transitory machine readable medium of claim 14, comprising the allocated cache resources allocated from an n-way set associative last level cache (LLC) for the processor, where "n" is any whole, positive number greater than 1.

16. The at least one non-transitory machine readable medium of claim 14, further comprising the instructions to cause the system to:
   cause all data in the isolated cache resources to be overwritten with random values before all the data in the isolated cache resources is caused to be flushed.

17. The at least one non-transitory machine readable medium of claim 14, comprising the instructions to further cause the system to:
   send a cache line flush (CLFLUSH)/CLFLUSH operation (CLFLUSHOPT) instruction to the processor to cause all the data in the isolated cache resources to be flushed.

18. The at least one non-transitory machine readable medium of claim 14, the first application comprising a virtual network function (VNF) application to fulfill a workload as part of providing a network service.

19. The at least one non-transitory machine readable medium of claim 18, the network service comprising a database network service, a website hosting network service, a routing network service, an e-mail network service, a firewalling service, a domain name service (DNS), a caching service, a network address translation (NAT) service or virus scanning network service.

* * * * *